United States Patent
Hsieh et al.

(10) Patent No.: US 10,284,079 B2
(45) Date of Patent: May 7, 2019

(54) DC-DC POWER CONVERTER CIRCUIT HAVING SWITCHED-CAPACITOR CIRCUIT AND METHOD OF CONTROLLING OUTPUT VOLTAGE OF THE SAME

(71) Applicant: NUVOTON TECHNOLOGY CORPORATION, Hsinchu (TW)

(72) Inventors: Chung-Ming Hsieh, Hsinchu Science Park (TW); Wei-Chan Hsu, Cupertino, CA (US)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 4 days.

(21) Appl. No.: 15/617,981

(22) Filed: Jun. 8, 2017

(65) Prior Publication Data

US 2018/0048226 A1    Feb. 15, 2018

(30) Foreign Application Priority Data

Aug. 9, 2016    (TW) .............................. 105125342 A (51) Int. Cl.
*H02M 3/07* (2006.01)
*H02M 3/06* (2006.01)

(52) U.S. Cl.
CPC .............. *H02M 3/06* (2013.01); *H02M 3/07* (2013.01)

(58) Field of Classification Search
CPC .................................. H02M 3/06; H02M 3/07
See application file for complete search history.

(56) References Cited

U.S. PATENT DOCUMENTS

| 5,623,198 | A  | * | 4/1997  | Massie      | G05F 1/575  |
|           |    |   |         |             | 323/282     |
| 7,279,959 | B1 | * | 10/2007 | Choy        | H02M 3/07   |
|           |    |   |         |             | 327/536     |
| 2004/0080962 | A1 | * | 4/2004 | Charych   | H02M 3/33515 |
|           |    |   |         |             | 363/21.11   |
| 2010/0321099 | A1 | * | 12/2010 | Hsieh     | H02M 3/07   |
|           |    |   |         |             | 327/536     |
| 2015/0008894 | A1 | * | 1/2015  | Cannankurichi | H02M 1/36 |
|           |    |   |         |             | 323/282     |

FOREIGN PATENT DOCUMENTS

TW                 529230 B       4/2003

* cited by examiner

*Primary Examiner* — Jue Zhang
*Assistant Examiner* — Jye-June Lee
(74) *Attorney, Agent, or Firm* — Muncy, Geissler, Olds & Lowe, P.C.

(57) ABSTRACT

A DC-DC power converter circuit includes a switched-capacitor circuit, an error amplifier, a latched comparator and a switching controller. The error amplifier adjusts an error amplification signal of the error amplifier in response to an output voltage of the switched-capacitor circuit and a reference voltage. The error amplification signal is then fed to the latched comparator as a comparison reference, resulting in the DC-DC power converter circuit being able to more precisely maintain the output voltage within a predetermined range.

8 Claims, 7 Drawing Sheets

DC-DC POWER CONVERTER CIRCUIT HAVING SWITCHED-CAPACITOR CIRCUIT AND METHOD OF CONTROLLING OUTPUT VOLTAGE OF THE SAME

CROSS-REFERENCE TO RELATED APPLICATION

This application claims the benefit of Taiwan Patent Application No. 105125342, filed on Aug. 9, 2016, at the Taiwan Intellectual Property Office, the disclosure of which is incorporated herein in its entirety by reference.

BACKGROUND OF THE INVENTION

1. Field of the Invention

The present disclosure relates to a DC-DC power converter circuit using a switched-capacitor circuit. More particularly, the present disclosure relates to a DC-DC power converter circuit using an error amplifier to generate and adjust an error amplification signal (which is used as a comparison reference) in response to an output voltage of the switched-capacitor circuit and a reference voltage, and a method of controlling the output voltage.

2. Description of the Related Art

In recent years, handheld devices and IoT (Internet of Thing) devices have undergone rapid development, and generally the aim is to produce these devices in ever smaller sizes. These devices require a voltage source such as a power integrated circuit (IC) to power the device's microcontroller unit or system on chip (SoC) IC, and most conventional high efficiency power ICs are implemented with a DC-DC power converter that uses an inductor of large size in order to store enough energy. This large inductor component is hard to integrate in a small-sized IC, which means that such a power IC must be coupled with an external inductor.

Due to rapid progress in manufacturing process technology and a decrease in the power required by the post-stage circuit, it is possible for implementation of the power IC as a high efficiency switched capacitor power converter which uses one or more capacitors instead of an inductor, and therefore it is possible for the switched capacitor power converter and the MCU to be integrated in the same IC. The switched capacitor power converter can be implemented without an external inductor, and so its volume can be reduced and the material cost of the hardware of the electronic product has also dropped. However, it is still difficult for the conventional switched capacitor power converter to stably maintain the output voltage within a precise range, therefore the conventional switched capacitor power converter is still inadequate for some circuit architectures with such requirements.

SUMMARY OF THE INVENTION

Therefore, it is an objective of the present disclosure to provide a DC-DC power converter circuit which includes a switched-capacitor circuit, an error amplifier and a latched comparator. The switched-capacitor circuit is coupled between an input terminal and an output terminal, and configured to receive an input voltage from the input terminal, perform a switching operation between a first phase and a second phase to generate an output voltage at the output terminal. The error amplifier includes a first input terminal configured to receive the output voltage, and a second input terminal configured to receive a reference voltage. The error amplifier is configured to amplify a difference between the output voltage and the reference voltage to output an error amplification signal. The latched comparator includes a first input terminal configured to receive the output voltage, a second input terminal configured to receive the error amplification signal, and a third input terminal configured to receive a frequency reference signal. The latched comparator is configured to compare the output voltage and the error amplification signal according to the frequency reference signal, and output a comparison signal to the switched-capacitor circuit which then performs the switching operation between the first phase and the second phase according to the comparison signal.

Preferably, the switched-capacitor circuit includes a non-overlapping switching controller configured to output a first control signal and a second control signal according to the comparison signal, thereby controlling the switching operation of the switched-capacitor circuit between the first phase and the second phase, and wherein the first control signal and the second control signal do not overlap with each other.

Preferably, the switched-capacitor circuit includes a plurality of capacitors, a plurality of first switches which are switched in response to the first control signal, and a plurality of second switches which are switched in response to the second control signal.

Preferably, the frequency reference signal is a clock signal outputted from an oscillator.

Preferably, a plurality of switched-capacitor circuits are coupled between the input terminal and the output terminal in parallel, receive the input voltage of the input terminal and perform the switching operation between the first phase and the second phase according to the comparison signal, thereby adjusting the output voltage.

Another objective of the present disclosure is to provide a method of controlling an output voltage of a DC-DC power converter. The method includes the following steps: providing a switched-capacitor circuit to receive an input voltage from an input terminal and generate an output voltage at an output terminal; providing an error amplifier which comprises a first input terminal configured to receive the output voltage, a second input terminal configured to receive a reference voltage, and using the error amplifier to amplify a difference between the output voltage and the reference voltage to output an error amplification signal; providing a latched comparator which comprises a first input terminal configured to receive the output voltage, a second input terminal configured to receive the error amplification signal, and a third input terminal configured to receive a frequency reference signal; comparing, by the latched comparator, the output voltage and the error amplification signal according to the frequency reference signal, and outputting a comparison signal; and controlling the switching operation of the switched-capacitor circuit between a first phase and a second phase, according to the comparison signal.

Preferably, the switched-capacitor circuit comprises a non-overlapping switching controller configured to output a first control signal and a second control signal according to the comparison signal, thereby controlling the switching operation of the switched-capacitor circuit between the first phase and the second phase, and wherein the first control signal and the second control signal do not overlap with each other.

Preferably, the switched-capacitor circuit comprises a plurality of capacitors, a plurality of first switches which are switched in response to the first control signal, and a plurality of second switches which are switched in response to the second control signal.

Preferably, the frequency reference signal is a clock signal outputted from an oscillator.

Preferably, there is a plurality of switched-capacitor circuits, and the method further includes the steps of: coupling the plurality of switched-capacitor circuits between the input terminal and the output terminal in parallel, in order to receive the input voltage of the input terminal; controlling, by switching controllers of the plurality of switched-capacitor circuits, the switching operation of the plurality of switched-capacitor circuits between the first phase and the second phase according to the comparison signal, in order to adjust the output voltage.

BRIEF DESCRIPTION OF THE DRAWINGS

The structure, operating principle and effects of the invention of the present disclosure will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and in the description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

Figure 1:
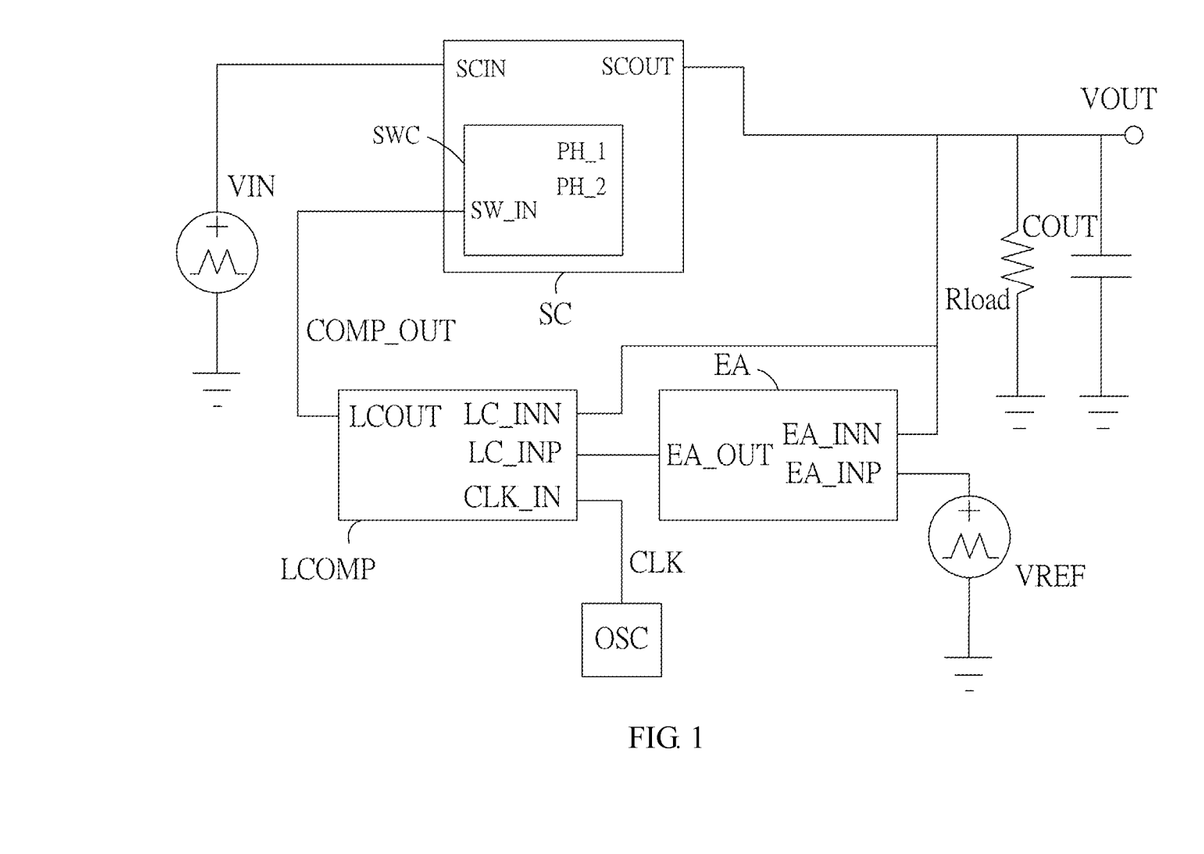
FIG. 1 is a circuit diagram of a DC-DC power converter circuit of the present disclosure.

The following refers to FIG. 1, which shows a circuit view of a DC-DC power converter circuit of the present disclosure. The DC-DC power converter circuit includes a switched-capacitor circuit SC, an error amplifier EA, and a latched comparator LCOMP The switched-capacitor circuit SC includes a switching controller SWC, an input terminal SCIN and an output terminal SCOUT. The input terminal SCIN is configured to receive an input voltage VIN. The switched-capacitor circuit SC performs a switching operation between a first phase and a second phase according to control signals outputted from a first control terminal PH_1 and a second control terminal PH_2 of the switching controller SWC, thereby generating an output voltage VOUT at the output terminal SCOUT. The output terminal SCOUT of the switched-capacitor circuit SC is electrically coupled to a load resistor Rload and an output capacitor COUT.

Ideally, the switched-capacitor circuit SC is operated under a fixed conversion ratio of the input voltage and the output voltage and is subject to a constant ratio and layout of capacitors of the switched-capacitor circuit SC. However, the input voltage VIN varies during actual operation, causing the output voltage VOUT to also vary. For example, the switched-capacitor circuit SC may be applied to a microcontroller (MCU), and in order to reduce energy consumption, in standby mode the MCU may decrease the input voltage, which results in a change in the output voltage VOUT of the switched-capacitor circuit SC. It is for this reason that the switched-capacitor circuit SC needs a scheme to make the output voltage VOUT stable for a predetermined voltage range. The switched-capacitor circuit SC of the present disclosure uses pulse frequency modulation (PFM) with the use of a latched comparator LCOMP, a switching controller SWC, and an oscillator OSC that outputs the clock signal CLK.

Figure 2A:
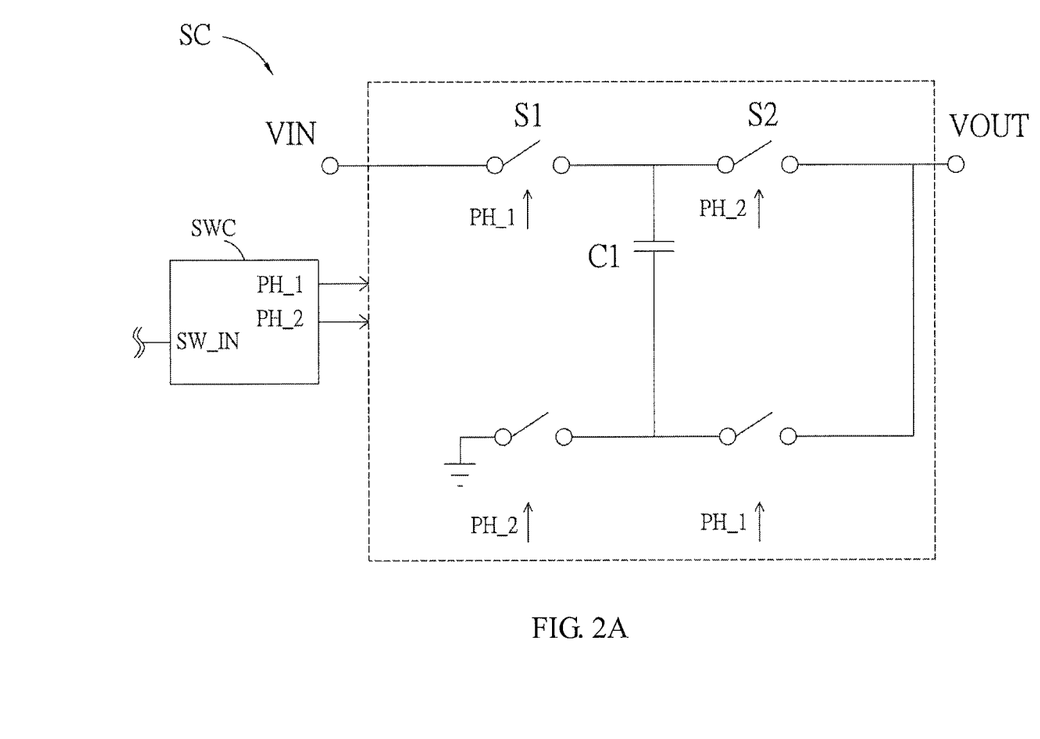
FIGS. 2A and 2B are circuit diagrams of a first embodiment and a second embodiment of the DC-DC power converter circuit of the present disclosure, respectively.
Figure 2B:
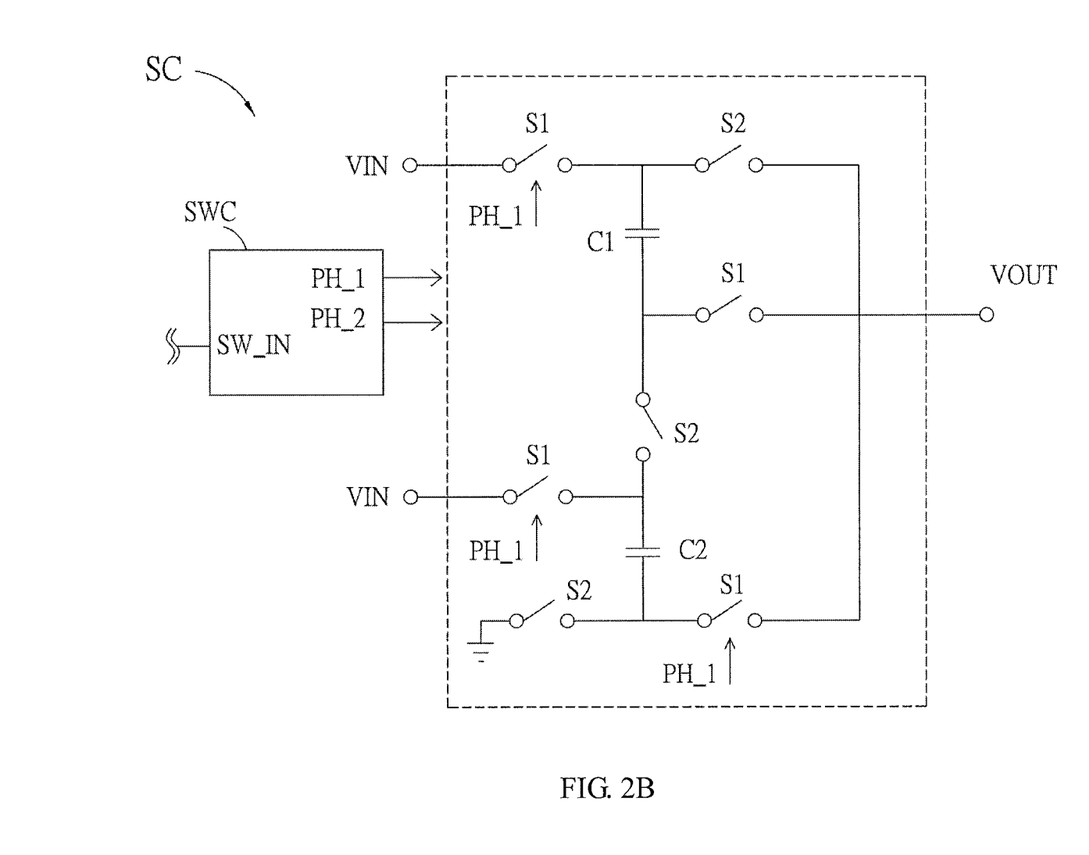

The following refers to FIGS. 2A and 2B, which show circuit diagrams of a first embodiment and a second embodiment of the switched-capacitor circuit of the present disclosure, respectively. As shown in FIG. 2A, the first embodiment of the switched-capacitor circuit includes a switching controller SWC, a plurality of first switches S1, a plurality of second switches S2 and a capacitor C1. Each of the plurality of first switches S1 includes a control terminal coupled to a first control terminal PH_1 of the switching controller SWC, and each of the plurality of second switches S2 includes a control terminal coupled to a second control terminal PH_2 of the switching controller SWC. When the plurality of first switches S1 are turned on and the plurality of second switches S2 are turned off, the switched-capacitor circuit is in the first phase in which the switched-capacitor circuit receives the input voltage VIN to charge the capacitor C1. When the plurality of first switches S1 are turned off and the plurality of second switches S2 are turned on, the switched-capacitor circuit is in the second phase in which the switched-capacitor circuit stops receiving the input voltage VIN and the capacitor C1 outputs energy to generate the output voltage VOUT.

In practice, the magnitude of the output voltage VOUT can be adjusted by adjusting the duration of the first phase and the number of the capacitors. As shown in FIG. 2B, the switched-capacitor circuit may include a plurality of capacitors C1 and C2 which receive the input voltage VIN separately.

The following refers back to FIG. 1. The latched comparator LCOMP includes a positive input terminal LC_INP, a negative input terminal LC_INN, a clock signal input terminal CLK_IN and an output terminal LCOUT. The oscillator OSC is configured to feed a clock signal CLK with stable cycles to the clock signal input terminal CLK_IN. With the clock signal CLK as the cue, the latched comparator LCOMP periodically compares the voltage signals of the positive input terminal LC_INP and the negative input terminal LC_INN, and outputs a comparison signal COMP_OUT. Upon receipt of the comparison signal COMP_OUT, the switching controller SWC changes the voltage level of the control signal at the first control terminal PH_1 and the second control terminal PH_2, to switch the switched-capacitor circuit SC between the first phase and the second phase, thereby adjusting the output voltage VOUT.

Conventionally, a reference voltage VREF and the output voltage VOUT are fed to the positive input terminal LC_INP and the negative input terminal LC_INN, respectively. At a rising edge or falling edge of the clock signal CLK, the latched comparator LCOMP is triggered to compare the voltage signals of the positive input terminal LC_INP and the negative input LC_INN, stores a comparison result and locks the output signal at the output LCOUT. When the clock signal CLK is at a low level, the latched comparator LCOMP resets the comparison result. When the output voltage VOUT is lower than the reference voltage VREF, the latched comparator LCOMP outputs the comparison signal COMP_OUT to the switching controller SWC, thereby controlling the switched-capacitor circuit SC to pull up the output voltage VOUT. However, this conventional method has the drawback of ripple in the output voltage VOUT, as the presence of ripple causes the mean value of the output voltage VOUT to be higher than the reference voltage. Furthermore, the ripple of the output voltage VOUT generally changes with different input voltages VIN. For this reason, the aforementioned architecture is not suitable for applications where precision is required in the level of the output voltage VOUT.

To solve the problem, an embodiment of the present disclosure further uses an error amplifier EA which includes a positive input terminal EA_INP, a negative input terminal EA_INN and an output EA_OUT. As shown in FIG. 1, the positive input terminal EA_INP receives a reference voltage VREF, the negative input terminal EA_INN receives the output voltage VOUT, and the error amplifier EA is configured to amplify a difference between the output voltage VOUT and the reference voltage VREF, and then feed an error amplification signal to the positive input terminal LC_INP of the latched comparator LCOMP.

According to the aforementioned architecture, when the output voltage VOUT is lower than the reference voltage VREF, the error amplifier EA amplifies the difference between the output voltage VOUT and the reference voltage VREF and then outputs the error amplification signal to the positive input terminal LC_INP of the latched comparator LCOMP According to the clock signal CLK, the latched comparator LCOMP periodically compares the error amplification signal EA_OUT and the output voltage VOUT, and sends the comparison signal COMP_OUT to the input terminal SW_IN of the switching controller SWC. As a result, according to the comparison signal COMP_OUT, the switching controller SWC changes the level of the control signal of the second control terminal PH_2 to control the switched-capacitor circuit SC to enter the second phase, thereby pulling up the output voltage VOUT. The error amplification signal EA_OUT outputted from the error amplifier EA is adjusted automatically, so that an average voltage of the output voltage VOUT of the switched-capacitor circuit of the present disclosure does not vary significantly when the load resistor Rload or the input voltage VIN is changed.

Figure 3:
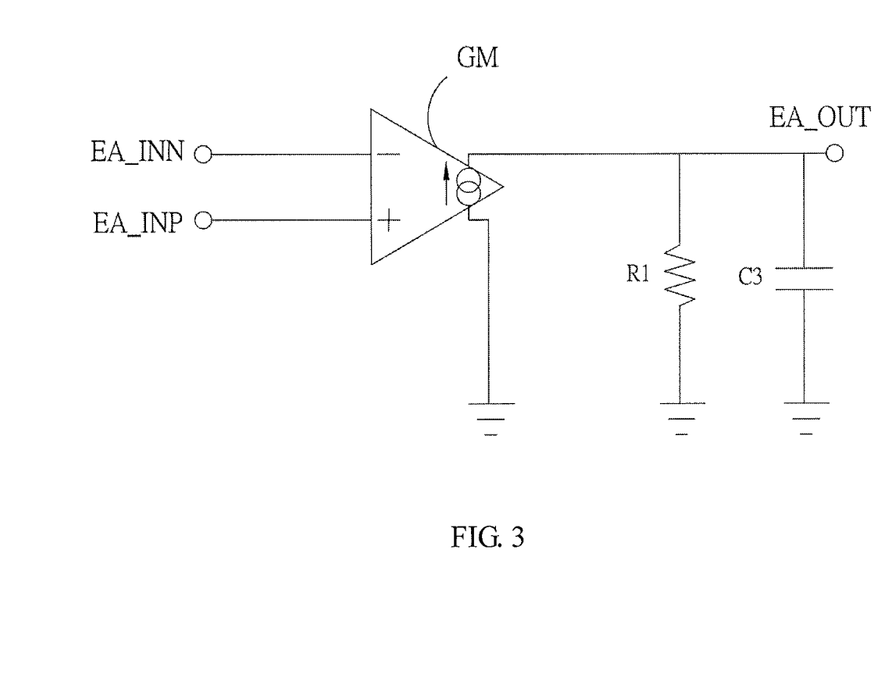
FIG. 3 is a circuit diagram of an embodiment of an error amplifier of the present disclosure.

The following refers to FIG. 3, which is a circuit diagram of an embodiment of the error amplifier EA of the present disclosure. The error amplifier EA may include a GM-type transconductance amplifier GM and a compensation circuit, such as a combination of a resistor R1 and a capacitor C3. It should be noted that this embodiment is merely taken as an example for illustration, and the present disclosure is not limited thereto.

In a preferred embodiment, the switching controller SWC of the switched-capacitor circuit can be a non-overlapping switching controller which separately inputs a first control signal and a second control signal to the first control terminal PH_1 and the second control terminal PH_2 of the switched-capacitor circuit SC according to the comparison signal COMP_OUT. The first control signal and the second control signal are separately used to control the switches of the switched-capacitor circuit SC, and they do not overlap with each other, for example, the first control signal and the second control signal are not at a high level at the same time.

Figure 4A:
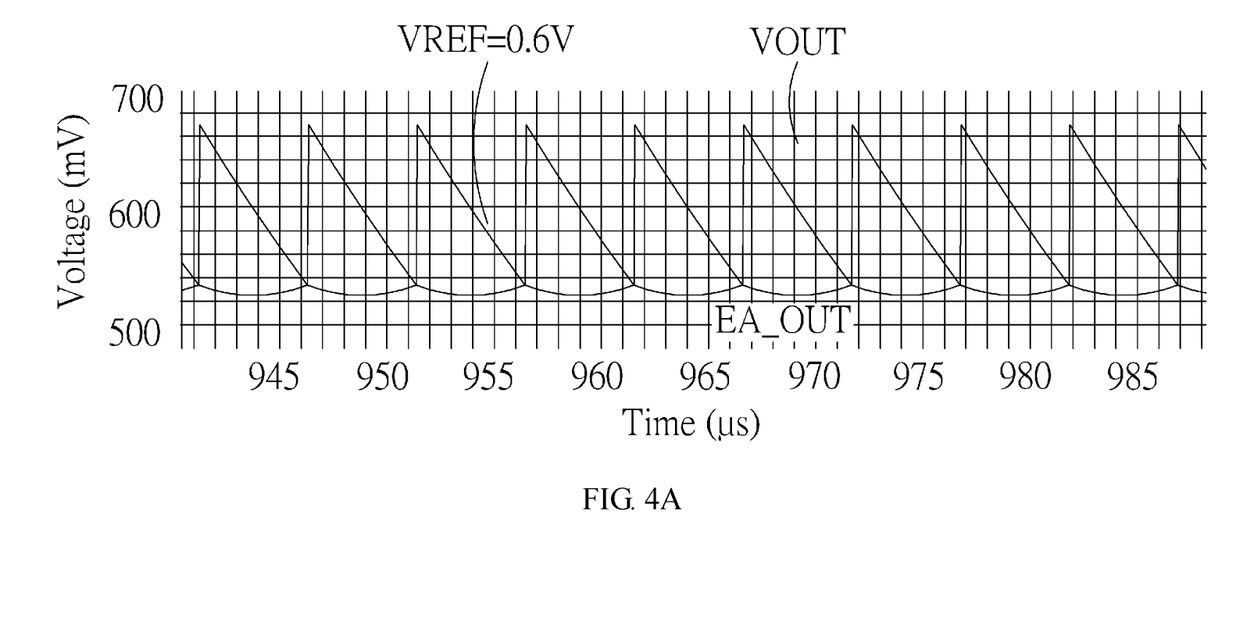
FIGS. 4A and 4B are wave diagrams of the clock signal, and then the reference voltage and the error amplification signal of the DC-DC power converter circuit of the present disclosure, respectively.
Figure 4B:
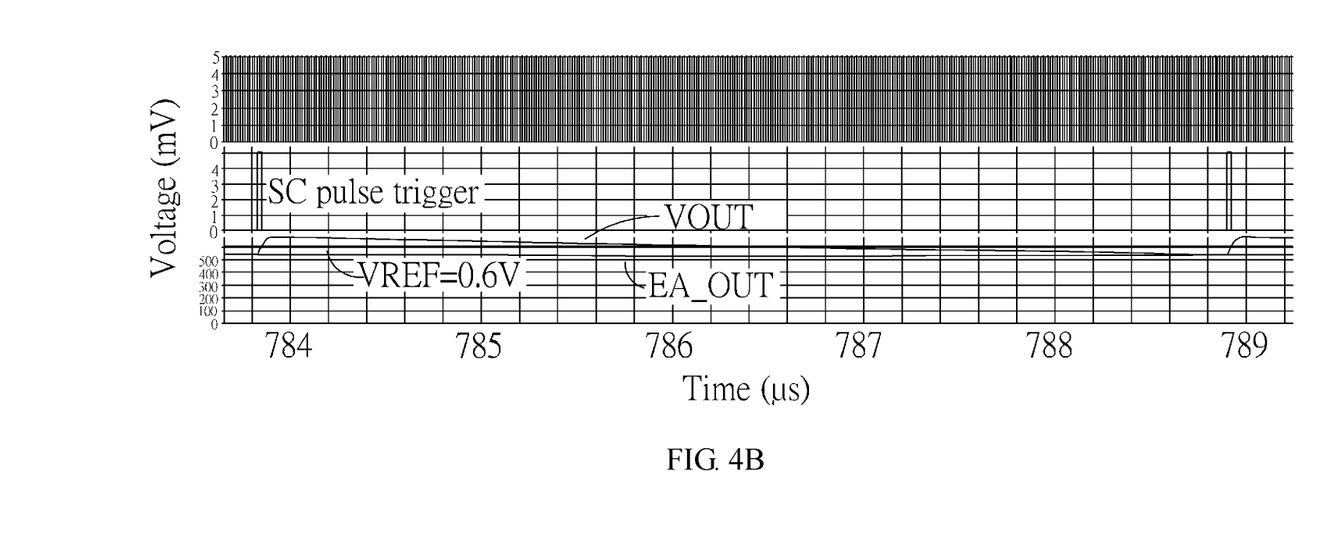

The following refers to FIGS. 4A and 4B, which separately show wave diagrams of the clock signal, the reference voltage and the error amplification signal of the DC-DC power converter circuit of the present disclosure. FIG. 4A shows the wave diagram of the reference voltage VREF, the output voltage VOUT and the error amplification signal EA_OUT.

The output voltage VOUT of the DC-DC power converter circuit is saw-wave shaped with 120 mV amplitude. The error amplifier EA generates and automatically adjusts the error amplification signal EA_OUT (which is fed to the latched comparator LCOMP as a comparison reference) in response to the changing output voltage VOUT, so that the comparison reference of the latched comparator LCOMP is lowered. For instance, in FIG. 4A, the comparison reference is lowered to about 530 mV. As a result, the output voltage VOUT remains about the reference voltage VREF with an average value of about 0.6 V. Therefore, the conventional technology limitation where the mean value of output voltage VOUT is higher than the reference voltage is effectively remedied in the present embodiment.

FIG. 4B shows the wave diagram of the clock signal CLK, the comparison signal $SC_{pulse\ trigger}$, the reference voltage VREF, the output voltage VOUT and the error amplification signal EA_OUT. The clock signal CLK is a square wave with a constant cycle. The error amplifier EA amplifies the difference of the output voltage VOUT and the reference voltage VREF, and then outputs the error amplification signal EA_OUT.

As shown in FIG. 4B, according to the clock signal CLK, the latched comparator LCOMP compares the reference voltage and the error amplification signal EA_OUT, and then outputs the comparison signal $SC_{pulse\ trigger}$ which is inputted to the switched-capacitor circuit SC, so that the switched-capacitor circuit SC enters the second phase to pull up the output voltage VOUT. As a result, the average value of the output voltage VOUT remains about the reference voltage VREF. Furthermore, the error amplifier EA used in the present disclosure does not affect the control scheme of the PFM architecture.

The above described embodiment includes one switched-capacitor circuit SC, but the DC-DC power convertor circuit of the present disclosure may include a plurality of switched-capacitor circuits SC which are coupled between the input terminal SCIN and the output terminal SCOUT in parallel and separately receive the input voltage VIN from the input terminal SCIN.

According to the comparison signal COMP_OUT, the switching controller SWC controls the plurality of switches of the switched-capacitor circuit SC to switch between the first phase and the second phase, separately. Therefore, the architecture of the present disclosure can be directly applied to a multiphase architecture to decrease the ripple of the output voltage. Preferably, the output capacitor COUT is omitted, so that the switched-capacitor circuit SC can be integrated into the microcontroller more easily.

Figure 5:
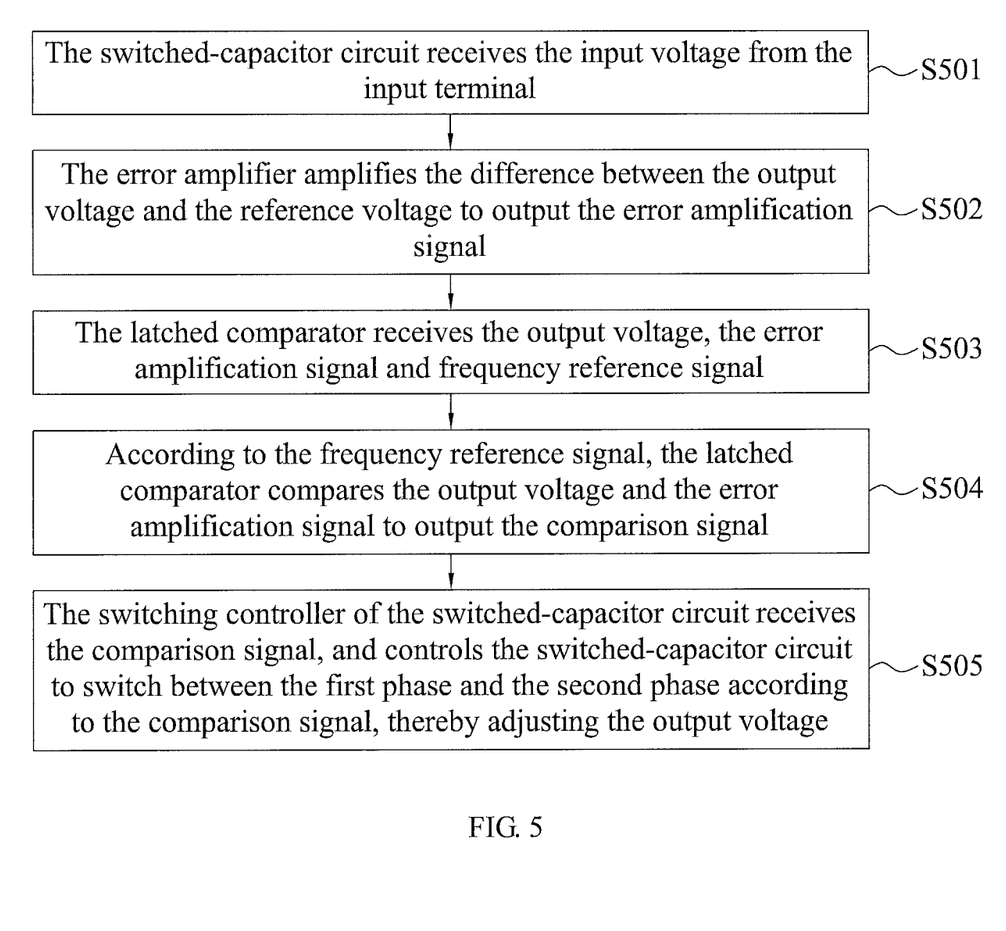
FIG. 5 is a flowchart showing the steps in an operation of a method of controlling the output voltage of the DC-DC power converter circuit of the present disclosure.

The following refers to FIG. 5, which is a flowchart showing the steps in an operation of a method of controlling the output voltage of the DC-DC power converter circuit of the present disclosure. Elements of the method which has already been described in above described embodiment are not repeated here. The method of controlling the output voltage of the DC-DC power converter circuit of the present disclosure includes the following steps.

In a step S501, the switched-capacitor circuit is configured to receive the input voltage from the input terminal, and the switched-capacitor circuit is controlled to switch between the first phase and the second phase, in order to generate the output voltage at the output terminal.

In a step S502, the error amplifier receives the output voltage at its first input terminal, receives the reference voltage at its second input terminal, and amplifies the difference between the output voltage and the reference voltage to output the error amplification signal.

In a step S503, the latched comparator receives the output voltage at its first input terminal, receives the error amplification signal at its second input terminal, and receives a frequency reference signal (such as the clock signal) at its third input terminal.

In a step S504, according to the frequency reference signal, the latched comparator compares the output voltage and the error amplification signal to output the comparison signal.

In a step S505, the switching controller of the switched-capacitor circuit receives the comparison signal, and controls the switched-capacitor circuit to switch between the first phase and the second phase according to the comparison signal, thereby adjusting the output voltage of the switched-capacitor circuit.

In contrast with conventional technology, the DC-DC power converter circuit and method of the present disclosure uses the error amplifier to adjust the comparison reference in response to the output voltage and the reference voltage, thereby more precisely maintaining the average value of the output voltage around the preset voltage-level.

Furthermore, the error amplification signal outputted from the error amplifier is adjusted automatically, so that change in the input voltage when there is a change in the load resistor does not significantly affect the average voltage of the output voltage. Also, use of the error amplifier does not affect the control characteristics of the original PFM architecture.

The present invention disclosed herein has been described by means of specific embodiments. However, numerous modifications, variations and enhancements can be made thereto by those skilled in the art without departing from the spirit and scope of the invention set forth in the claims.

What is claimed is:

1. A DC-DC power converter circuit, comprising:
    a switched-capacitor circuit, coupled between an input terminal and an output terminal, configured to receive an input voltage from the input terminal, and performing a switching operation between a first phase and a second phase to generate an output voltage at the output terminal, wherein the switched-capacitor circuit is operated under a pulse frequency modulation (PFM) control scheme;
    an error amplifier, comprising a first input terminal configured to receive the output voltage, and a second input terminal configured to receive a reference voltage, wherein the error amplifier is configured to amplify a difference between the output voltage and the reference voltage to output an error amplification signal;
    a latched comparator, comprising a first input terminal configured to receive the output voltage, a second input terminal configured to receive the error amplification signal, and a third input terminal configured to receive a frequency reference signal, wherein the latched comparator is configured to compare the output voltage and the error amplification signal according to the frequency reference signal, and output a comparison signal to the switched-capacitor circuit which performs the switching operation between the first phase and the second phase according to the comparison signal,
    wherein the frequency reference signal is a clock signal outputted from an oscillator, and the latched comparator is triggered to compare the output voltage and the error amplification signal at a rising edge or falling edge of the clock signal.

2. The DC-DC power converter circuit according to claim 1, wherein the switched-capacitor circuit comprises a non-overlapping switching controller configured to output a first control signal and a second control signal according to the comparison signal, thereby controlling the switching operation of the switched-capacitor circuit between the first phase and the second phase, and wherein the first control signal and the second control signal do not overlap with each other.

3. The DC-DC power converter circuit according to claim 2, wherein the switched-capacitor circuit comprises a plurality of capacitors, a plurality of first switches which are switched in response to the first control signal, and a plurality of second switches which are switched in response to the second control signal.

4. The DC-DC power converter circuit according to claim 1, wherein a plurality of switched-capacitor circuits are coupled between the input terminal and the output terminal in parallel, receive the input voltage of the input terminal, and perform the switching operation between the first phase and the second phase according to the comparison signal, thereby adjusting the output voltage.

5. A method of controlling an output voltage of a DC-DC power converter, comprising:
    providing a switched-capacitor circuit to receive an input voltage from an input terminal and generate an output voltage at an output terminal, wherein the switched-capacitor circuit is operated under a pulse frequency modulation (PFM) control scheme;
    providing an error amplifier, which comprises a first input terminal configured to receive the output voltage, and a second input terminal configured to receive a reference voltage, using the error amplifier to amplify a difference between the output voltage and the reference voltage, and outputting the amplified difference as an error amplification signal;
    providing a latched comparator which comprises a first input terminal configured to receive the output voltage, a second input terminal configured to receive the error amplification signal, and a third input terminal configured to receive a frequency reference signal;

comparing, by the latched comparator, the output voltage and the error amplification signal according to the frequency reference signal, and outputting a comparison signal; and controlling the switching operation of the switched-capacitor circuit between a first phase and a second phase, according to the comparison signal, wherein the frequency reference signal is a clock signal outputted from an oscillator, and the latched comparator is triggered to compare the output voltage and the error amplification signal at a rising edge or falling edge of the clock signal.

6. The method of claim 5, wherein the switched-capacitor circuit comprises a non-overlapping switching controller configured to output a first control signal and a second control signal according to the comparison signal, thereby controlling the switching operation of the switched-capacitor circuit between the first phase and the second phase, and wherein the first control signal and the second control signal do not overlap with each other.

7. The method of claim 6, wherein the switched-capacitor circuit comprises a plurality of capacitors, a plurality of first switches which are switched in response to the first control signal, and a plurality of second switches which are switched in response to the second control signal.

8. The method of claim 5, wherein a plurality of switched-capacitor circuits are provided, and the method further comprises:

coupling the plurality of switched-capacitor circuits between the input terminal and the output terminal in parallel, in order to receive the input voltage of the input terminal;

controlling, by switching controllers of the plurality of switched-capacitor circuits, the switching operation of the plurality of switched-capacitor circuits between the first phase and the second phase according to the comparison signal, in order to adjust the output voltage.

* * * * *